United States Patent
Subramanian et al.

(10) Patent No.: US 9,896,598 B2
(45) Date of Patent: Feb. 20, 2018

(54) DIRECT-TO-METAL RADIATION CURABLE COMPOSITIONS

(71) Applicant: ALLNEX IP S.a.r.L., Luxemberg (LU)

(72) Inventors: Ramesh Subramanian, Louisville, KY (US); Kurt E. Best, Sewickley, PA (US); Charles A. Gambino, McDonald, PA (US); Christine A. Mebane, Braddock, PA (US); Michael K. Jeffries, Follansbee, WV (US); Myron W. Shaffer, New Cumberland, WV (US); Michael J. Dvorchak, Monroeville, PA (US)

(73) Assignee: ALLNEX IP S.a.r.L.

( * ) Notice: Subject to any disclaimer, the term of this patent is extended or adjusted under 35 U.S.C. 154(b) by 209 days.

(21) Appl. No.: 13/948,358

(22) Filed: Jul. 23, 2013

(65) Prior Publication Data
US 2013/0302530 A1    Nov. 14, 2013

Related U.S. Application Data

(63) Continuation of application No. 12/008,084, filed on Jan. 8, 2008, now abandoned.

(51) Int. Cl.
*C09D 4/06* (2006.01)
*C09D 133/14* (2006.01)
*C09D 175/16* (2006.01)

(52) U.S. Cl.
CPC ............. *C09D 175/16* (2013.01); *C09D 4/06* (2013.01); *C09D 133/14* (2013.01)

(58) Field of Classification Search
CPC ...... C09D 175/16; C09D 133/14; C09D 4/06; C08F 290/067; C08F 2/50; C08L 47/00
USPC ..... 522/65, 66, 81, 83, 90–93, 100; 427/520
See application file for complete search history.

(56) References Cited

U.S. PATENT DOCUMENTS

| 3,002,959 | A | 10/1961 | Hicks |
| 3,108,100 | A | 10/1963 | Tate et al. |
| 3,110,695 | A | 11/1963 | Ceresa |
| 3,124,605 | A | 3/1964 | Wagner |
| 3,183,112 | A | 5/1965 | Gemassmer |
| 3,304,273 | A | 2/1967 | Stamberger |
| 3,358,010 | A | 12/1967 | Britain |
| 3,375,227 | A | 3/1968 | Hicks |
| 3,383,351 | A | 5/1968 | Stamberger |
| 3,487,080 | A | 12/1969 | Matsui et al. |
| 3,523,095 | A | 8/1970 | Laurito et al. |
| 3,644,490 | A | 2/1972 | Schmelzer et al. |
| 3,769,318 | A | 10/1973 | Windemuth et al. |
| 3,862,973 | A | 1/1975 | Dietrich et al. |
| 3,903,126 | A | 9/1975 | Woerner et al. |
| 3,903,127 | A | 9/1975 | Wagner et al. |
| 3,919,218 | A | 11/1975 | Schmitt et al. |
| 4,040,992 | A | 8/1977 | Bechara et al. |
| 4,051,165 | A | 9/1977 | Wagner et al. |
| 4,081,492 | A | 3/1978 | Traenckner et al. |
| 4,147,714 | A | 4/1979 | Hetzel et al. |
| 4,160,080 | A | 7/1979 | Koenig et al. |
| 4,220,749 | A | 9/1980 | Reichmann et al. |
| 4,253,918 | A | 3/1981 | Traenckner et al. |
| 4,288,586 | A | 9/1981 | Bock et al. |
| 4,324,879 | A | 4/1982 | Bock et al. |
| 4,380,604 | A | 4/1983 | Neuhaus et al. |
| 4,439,593 | A | 3/1984 | Kelso et al. |
| 4,442,145 | A | 4/1984 | Probst et al. |
| 4,518,522 | A | 5/1985 | Markusch et al. |
| 4,937,173 | A | 6/1990 | Kanda et al. |
| 5,013,631 | A | 5/1991 | Su |
| 5,128,387 | A * | 7/1992 | Shustack ......................... 522/92 |
| 5,154,950 | A * | 10/1992 | Rosthauser et al. .......... 427/340 |
| 5,213,875 | A | 5/1993 | Su et al. |
| 5,236,741 | A | 8/1993 | Zwiener et al. |
| 5,362,773 | A | 11/1994 | Brindoepke et al. |
| 5,684,081 | A | 11/1997 | Dannhorn et al. |
| 5,726,255 | A | 3/1998 | Meixner et al. |
| 5,747,629 | A | 5/1998 | Yeske et al. |
| 5,756,829 | A | 5/1998 | Meixner et al. |
| 5,821,326 | A | 10/1998 | Kurek et al. |
| 5,914,383 | A | 6/1999 | Richter et al. |
| 6,011,078 | A | 1/2000 | Reich et al. |
| 6,169,141 | B1 | 1/2001 | Kurek et al. |
| 6,232,360 | B1 | 5/2001 | Meixner et al. |
| 6,261,645 | B1 * | 7/2001 | Betz et al. .................... 427/500 |
| RE37,448 | E | 11/2001 | Meixner et al. |
| 6,359,082 | B1 | 3/2002 | Meixner et al. |
| 6,509,389 | B1 | 1/2003 | Krohn |
| 6,521,702 | B1 | 2/2003 | Weikard et al. |
| 6,538,044 | B2 | 3/2003 | Ledniczky et al. |
| 6,541,536 | B2 | 4/2003 | Weikard et al. |
| 6,559,225 | B1 | 5/2003 | Irle et al. |
| 6,579,932 | B1 | 6/2003 | Schipper et al. |
| 6,753,394 | B2 | 6/2004 | Weikard et al. |
| 6,790,485 | B2 | 9/2004 | Baumbach et al. |
| 6,825,240 | B2 * | 11/2004 | Wenning et al. ............... 522/90 |
| 6,838,177 | B2 | 1/2005 | Fenn et al. |
| 7,268,172 | B2 | 9/2007 | Bach et al. |
| 2003/0045596 | A1 | 3/2003 | Krohn |
| 2003/0045598 | A1 | 3/2003 | Chen et al. |
| 2003/0050390 | A1 | 3/2003 | Weikard et al. |
| 2003/0059555 | A1 | 3/2003 | Fenn et al. |

(Continued)

FOREIGN PATENT DOCUMENTS

| EP | 1308538 A2 | 5/2003 |
| EP | 1647585 B1 | 1/2008 |

(Continued)

*Primary Examiner* — Michael Pepitone
*Assistant Examiner* — Jessica Roswell
(74) *Attorney, Agent, or Firm* — Drinker Biddle & Reath LLP

(57) ABSTRACT

A process of directly coating a metal substrate and curing the coating using radiation sources such as UV radiation having a wavelength of 200 nm and above. Furthermore, compositions of the invention can be used as a tie-coat for coatings that do not bond well directly to various metal substrates.

32 Claims, No Drawings

(56) References Cited

U.S. PATENT DOCUMENTS

2006/0084713 A1* 4/2006 Bach et al. .................. 522/168
2008/0102262 A1* 5/2008 Esaki ..................... B32B 27/36
                                                        428/220

FOREIGN PATENT DOCUMENTS

| GB | 994890 | 6/1965 |
|----|--------|--------|
| GB | 1040452 | 8/1966 |
| GB | 1465812 | 3/1977 |
| GB | 1515868 | 6/1978 |
| WO | 0132321 A2 | 5/2001 |
| WO | 0174499 A1 | 10/2001 |

* cited by examiner

DIRECT-TO-METAL RADIATION CURABLE COMPOSITIONS

This application is a continuation of U.S. Ser. No. 12/008,084 filed Jan. 8, 2008, now abandoned.

BACKGROUND OF THE INVENTION

Direct-to-metal ambient rapid-cure coatings with good adhesion and performance characteristics have always been a challenge in the coatings industry. The high throughput rates combined with cure speed is of paramount importance for a metal coater to get the parts done in a fast and timely manner. Various technologies are available of which UV cure coatings is the technology of choice for very high throughput applications. The object of the present invention is to provide a coatings process that can meet the above described challenge.

UV curable coating compositions are known in the art. U.S. Pat. No. 5,684,081 describes a radiation-curable, aqueous dispersion, although the reference is silent as to the wavelength of the radiation to be used. Also known are compositions that are curable using UV radiation having a very low UV-B content and substantially no UV-C content (see, e.g., U.S. Patent Application Publication No. 2003/0059555 and U.S. Pat. No. 6,538,044). The compositions described in the '044 patent are fragranced lacquer coatings that are non-aqueous and are not based on urethane chemistry. The '555 publication describes solvent-based compositions useful as primers. The compositions therein are non-aqueous and require wiping of the coating with an organic solvent following exposure to UV radiation and before sanding of the coated part.

U.S. Pat. No. 6,559,225 describes an aqueous polyurethane dispersion for use in lacquers and coatings. The '225 patent does not describe UV curing, and hints that the dispersions described therein can be combined with radiation-curable binders (column 5, lines 17-20). U.S. Pat. No. 6,579,932 describes an aqueous coating composition which is a mixture of a polyurethane/acrylate hybrid dispersion and a polyurethane resin with oxidative drying groups. The '932 patent does not describe UV curing.

Aqueous radiation curable dispersions are also known (see, e.g., U.S. Pat. Nos. 5,362,773, 6,011,078, 6,479,577, 6,521,702 and 6,541,536).

Non-aqueous, radiation curable compositions are also known. WO 01/74499 describes a primer composition containing one or more compounds containing two or more ethylenically unsaturated polymerizable groups per molecule. Among the compounds described are epoxy acrylates, urethane acrylates and unsaturated polyesters. The compositions described therein also require significant amounts of relatively low molecular weight materials (such as ethylhexyl acrylate and isobornyl methacrylate). The '499 publication indicates that the compositions described therein can be cured with UV radiation using UV lamps having a UV-B:UV-A ratio of 1:1 or less and substantially no UV-C content. As in the '555 publication noted above, the compositions require wiping of the coating with an organic solvent following exposure to UV radiation and before sanding of the coated part. Similar compositions are described in published U.S. Patent Application Publication Nos. 2003/0045598 and 2003/045596, and U.S. Pat. Nos. 4,937,173, 5,013,631, 5,213,875 and 6,509,389.

Radiation curable urethane acrylates are also described in U.S. Pat. Nos. 4,380,604, 6,232,360, 6,753,394 and 6,790,485. Finally, radiation curable epoxy acrylates are described in U.S. Pat. Nos. 5,726,255, 5,756,829, 6,359,082, RE 37,448 and 7,268,172 B2.

SUMMARY OF THE INVENTION

The present invention involves a method of coating a metal substrate comprising applying a non-aqueous composition directly to the metal substrate, wherein the non-aqueous composition comprises A) from about 10% to about 100% by weight of an unsaturated (meth)acrylate polymer or oligomer consisting of:
  a) an unsaturated urethane (meth)acrylate polymer or oligomer, and is prepared by reacting:
    ai) one or more organic polyisocyanates, and
    aii) one or more —NH or —OH functional compounds having a number average molecular weight of from about 60 to about 600, and
    aiii) 1) from 0 to about 100% by weight of a mono-, di-, tri- or poly-hydroxyl-$C_1$-$C_{10}$-alkyl or $C_6$-$C_{10}$-aryl (meth)acrylate,
      2) from 0 to 100% by weight of an unsaturated polyether or polyester (meth)acrylate polyol having an OH number of from about 30 to about 500 and prepared by reacting a polyether or polyester di- or polyol with acrylic and/or methacrylic acid, and
      3) or the combination of aiii) 1) and aii) 2) wherein the percents by weight of components aiii) 1), aiii) 2) are based on the total weight of components aiii) 1) and aiii) 2 and total 100%,
  at an isocyanate to hydroxyl equivalent ratio of from about 0.9:1 to about 1:0.9, B) from about 0 to about 90% by weight of an unsaturated epoxy (meth)acrylate which is substantially free from epoxide groups and is prepared by reacting
  bi) one or more organic compounds containing at least one epoxide group and having a number average molecular weight of from about 130 to about 1000,
  bii) from 1.3 to 3.0 carboxy equivalents of organic dicarboxylic acid or anhydride having a number average molecular weight of from about 98 to about 166,
  biii) 1 hydroxy equivalent of an hydroxyl group containing reaction product, prepared at a carboxy to hydroxyl equivalent ratio of from 0.6:1 to 0.95:1 of
    1) (meth)acrylic acid and
    2) tri- or tetrahydroxy ether alcohols having a number average molecular weight of from about 180 to about 1000 and containing at least two ethylene and/or propylene oxide units as part of an ether structure,
  with the ratio of reactive equivalents of components bii) through biii) to epoxide equivalents of component bi) being at least about 1:1, C) from 0 to about 100% by weight of reactive diluents selected from a mono-, di-, tri- or poly —$C_1$-$C_{10}$-alkyl or $C_6$-$C_{10}$-aryl {(meth)acrylates} or vinyl ethers or their mixtures, wherein the % by weight of component C) is based on the total combined amount of components A) and B), D) from about 0.1 to about 10% by weight of one or more photoinitiators, wherein the % by weight of component D) is based on the combined weight of components A), B) and C) and wherein the percentages of components A), B) and C) total 100%, and E) from 0 to about 90% by weight of solvent or a mixture of solvents, wherein the % by weight of component E) is based on the total combined amount of components A), B) and D).

DETAILED DESCRIPTION OF THE PREFERRED EMBODIMENTS

As used herein and in the claims, the term "molecular weight" or MW refers to number average molecular weight. More particularly, the present invention is directed to a process of coating directly-to-metal and curing using radiation sources such as UV radiation having a wavelength of 200 nm or more, and preferably radiation having a wavelength of from about 220 nm to about 450 nm. Furthermore, compositions of the invention can be used as a tie-coat for coatings that do not bond well directly to various metal substrates.

The compositions of the present invention are non-aqueous compositions comprising A) from about 10% to about 100% by weight, preferably from about 20 to about 90% by weight, and most preferably from about 25 to about 75% by weight, of an unsaturated (meth)acrylate polymer or oligomer consisting of:
  a) an unsaturated urethane (meth)acrylate polymer or oligomer, and is prepared by reacting:
    ai) one or more organic polyisocyanates, and
    aii) one or more —NH or —OH functional compounds having a number average molecular weight of from about 60 to about 600, and
    aiii) 1) from 0 to about 100% by weight, preferably from about 10 to about 90% by weight, and most preferably from about 25 to about 75% by weight, of a mono-, di-, tri- or poly-hydroxyl-$C_1$-$C_{10}$-alkyl or $C_6$-$C_{10}$-aryl (meth)acrylate,
    2) from 0 to 100% by weight of an unsaturated polyether or polyester (meth)acrylate polyol having an OH number of from about 30 to about 500 (preferably from about 100 to about 400 and most preferably from about 100 to about 300), and prepared by reacting a polyether di- or polyol with acrylic and/or methacrylic acid, and
    3) or the combination of aiii) 1) and aii) 2) wherein the percents by weight of components aiii) 1), aiii) 2) are based on the total weight of components aiii) 1) and aiii) 2 and total 100%,
  at an isocyanate to hydroxyl equivalent ratio of from about 0.9:1 to about 1:0.9 (and preferably about 1:1),
B) from about 0 to about 90% by weight, preferably from about 5 to about 80% by weight, and most preferably from about 10 to about 50% by weight, of an unsaturated epoxy (meth)acrylate which is substantially free from epoxide groups and is prepared by reacting
  bi) one or more organic compounds containing at least one epoxide group and having a number average molecular weight of from about 130 to about 1000,
  bii) from 1.3 to 3.0 carboxy equivalents of organic dicarboxylic acid or anhydride having a number average molecular weight of from about 98 to about 166,
  biii) 1 hydroxy equivalent of an hydroxyl group containing reaction product, prepared at a carboxy to hydroxyl equivalent ratio of from 0.6:1 to 0.95:1 of
    1) (meth)acrylic acid and
    2) tri- or tetrahydroxy ether alcohols having a number average molecular weight of from about 180 to about 1000 and containing at least two ethylene and/or propylene oxide units as part of an ether structure,
  with the ratio of reactive equivalents of components bii) through biii) to epoxide equivalents of component bi) being at least about 1:1,
C) from 0 to about 100% by weight, preferably from about 10 to about 90% by weight, and most preferably from about 25 to about 75% by weight, of reactive diluents selected from a mono-, di-, tri- or poly —$C_1$-$C_{10}$-alkyl or $C_6$-$C_{10}$-aryl {(meth) acrylates} or vinyl ethers or their mixtures, wherein the % by weight of component C) is based on the total combined amount of components A) and B),
D) from about 0.1 to about 10% by weight, preferably from about 0.5 to about 6% by weight, and most preferably from about 1 to about 4% by weight, of one or more photoinitiators, wherein the % by weight of component D) is based on the combined weight of components A), B) and C) and wherein the percentages of components A), B) and C) total 100%, and
E) from 0 to about 90% by weight of solvent or a mixture of solvents, wherein the % by weight of component E) is based on the total combined amount of components A), B) and C).

Component A is an unsaturated (meth)acrylate polymer or oligomer. Useful urethane (meth)acrylates are described in U.S. Pat. Nos. 4,380,604 and 6,753,394, the entire disclosures of which are herein incorporated by reference. Useful epoxy acrylates are described in U.S. Pat. Nos. 5,726,255, and RE 37,448, the entire disclosures of which are herein incorporated by reference.

Component A)

As noted above, useful urethane (meth)acrylates are described in U.S. Pat. Nos. 4,380,604 and 6,753,394. Such urethane (meth)acrylates are generally prepared by reacting one more polyisocyanates with an hydroxyl group-containing unsaturated (meth)acrylate.

Suitable polyisocyanates include organic polyisocyanates having aliphatically, cycloaliphatically and/or aromatically bound isocyanate groups and generally having molecular weights of from about 144 to about 1000, more preferably from about 168 to about 300. Suitable examples include butylene diisocyanate, hexamethylene diisocyanate (HTI), isophorone diisocyanate (IPDI), 3(4)-isocyanatomethyl-methylcyclohexyl isocyanate (IMCI), trimethylhexamethylene diisocyanate (2,2,4 and/or 2,4,4-trimethyl-hexamethylene diisocyanate), the isomeric bis(4,4'-isocyanato-cyclohexyl)methanes ($H_{12}$MDI), the isomeric bis (isocyanatomethyl)-methylcyclohexanes, isocyanatomethyl-1,8-octane diisocyanate, 1,4-cyclohexylene diisocyanate, 1,4-phenylene diisocyanate, 2,4- and/or 2,6-toluoylene diisocyanate (TDI), 1,5-naphthylene diisocyanate, 2,4'- and/or 4,4'-diphenylmethane diisocyanate (MDI), triphenylmethane-4,4',4"-triisocyanate or their derivatives having a urethane, isocyanurate, allophanate, biuret, uretdione, iminooxadiazinedione structure and/or mixtures thereof as well as mixtures of aliphatic and aromatic diisocyanates and/or polyisocyanates. The production of such derivatives is known and described, for example, in U.S. Pat. Nos. 3,124,605, 3,183,112, 3,919,218, and 4,324,879 and in EP 798 299.

Preferably used are HDI, IPDI, TDI, $H_{12}$MDI and/or isocyanurate group-containing polyisocyanates obtained by trimerization of HDI, TDI or IPDI. Particularly preferred are HDI and IPDI and mixtures thereof.

The —NH and —OH functional compounds useful herein as component au) have number average molecular weights of from about 60 to about 600 and preferably from about 60 to about 200. Specifically useful —OH functional compounds include ethylene glycol; diethylene glycol; triethylene glycol; propylene glycol; dipropylene glycol; butane diols; hexane diols; glycerin; trimethylolethane; trimethylolpropane; pentaerythritol; hexane triols; mannitol; sorbitol; glucose; fructose; mannose; sucrose; and propoxylated and/or ethoxylated adducts of any of the above-noted hydroxy functional materials having number average molecular weights of up to about 600.

Suitable —NH functional compounds include, for example, ethylene diamine, 1,2-diaminopropane, 1,4-diaminobutane, 1,6-diaminohexane, 2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethyl-cyclohexane, 2,4- and/or 2,6-hexahydrotoluoylene diamine, 2,4'- and/or 4,4'-diaminodicyclohexyl methane and 3,3'-dimethyl-4,4'-diaminodicyclohexyl methane. Aromatic polyamines such as 2,4- and/or 2,6-diaminotoluene and 2,4'- and/or 4,4'-diaminodiphenyl methane are also suitable but less preferred. Relatively high molecular weight polyether polyamines containing aliphatically bound primary amino groups, for example, the products marketed under the Jeffamine trademark by Texaco, are also suitable.

In preparing the unsaturated urethane (meth)acrylate, the polyisocyanate is reacted at an isocyanate to OH equivalent ratio of from 0.5:1 to 1:0.5, preferably about 0.9:1 to about 1:0.9, and more preferably about 1:1, with i) an unsaturated polyether (meth)acrylate having an OH number of from about 30 to about 300, ii) a mono-, di-, tri-, or polyhydroxyl $C_1$ to $C_{10}$-alkyl or $C_6$ to $C_{10}$-aryl (meth)acrylate, or iii) a mixture thereof.

Useful unsaturated polyether (meth)acrylates are prepared by reacting a polyether polyol (having an hydroxyl functionality of from 2 to 6) with acrylic and/or methacrylic acid. Suitable polyether polyols are of the type known in the polyurethane art and are generally prepared by reacting a suitable staring molecule such as, e.g., ethylene glycol, propylene glycol, butanol, glycerol, trimethylol propane, hexane dial, pentaerythritol and the like with ethylene oxide, propylene oxide or a mixture thereof. The polyether is then reacted with acrylic and/or methacrylic acid. When the unsaturated (meth)acrylate is to be used to prepare the unsaturated urethane (meth)acrylate, the polyether is selected so as to produce the (meth)acrylate having the required OH number and the components are reacted in amounts such that the resultant unsaturated polyether (meth)acrylate has an OH number of from about 30 to about 500, preferably from about 100 to about 400 and most preferably from about 100 to about 300. In the case where the unsaturated (meth)acrylate is to be used as an part or all of component A), the polyether is selected so as to produce the (meth)acrylate having the required OH number and the polyether and acrylic (and/or methacrylic) acid are reacted in amounts such that the resultant unsaturated polyether (meth)acrylate has an OH number of from about 30 to about 500, preferably from about 100 to about 400 and most preferably from about 100 to about 300.

Useful unsaturated polyester (meth)acrylates are prepared by reacting a polyester polyol (having an hydroxyl functionality of from 2 to 6) with acrylic and/or methacrylic acid. Suitable polyester polyols are of the type known in the polyurethane art and are generally prepared by reacting a suitable staring glycols such as, e.g., ethylene glycol, propylene glycol, butanol, glycerol, trimethylol propane, hexane diol, pentaerythritol and the like with diacids or anhydrides (such as adipic, fumaric, maleic, terephthalic, isophthalic, phthalic and the like, or a mixture thereof. The polyester polyol is then reacted with acrylic and/or methacrylic acid. When the unsaturated (meth)acrylate is to be used to prepare the unsaturated urethane (meth)acrylate, the polyester is selected so as to produce the (meth)acrylate having the required OH number and the components are reacted in amounts such that the resultant unsaturated polyester (meth)acrylate has an OH number of from about 30 to about 500, preferably from about 100 to about 400 and most preferably from about 100 to about 300. In the case where the unsaturated (meth)acrylate is to be used as an part or all of component A), the polyester is selected so as to produce the (meth)acrylate having the required OH number and the polyester and acrylic (and/or methacrylic) acid are reacted in amounts such that the resultant unsaturated polyester (meth)acrylate has an OH number of from about 30 to about 500, preferably from about 100 to about 400 and most preferably from about 100 to about 300.

Useful mono, di-, tri-, or polyhydroxyl $C_1$ to $C_{10}$-alkyl or $C_6$ to $C_{10}$-aryl (meth)acrylates are also known in the polyurethane art. Such material are prepared by reacting relatively low molecular weight diols, triols and polyols (such as ethylene glycol, propylene glycol, butanol, glycerol, trimethylol propane, hexane diol, pentaerythritol and the like) with acrylic and/or methacrylic acid in amounts such that the resultant product contains one or more hydroxyl groups. Specific examples include hydroxyethyl acrylate, hydroxypropyl acrylate, hydroxybutyl acrylate, hydroxypropyl acrylate, hydroxyhexyl acrylate, triglycerol diacrylate, dipentaerythritol pentaacrylate, and the corresponding methacrylates.

Component B)

Component B) is an unsaturated epoxy (meth)acrylate which is substantially free from epoxide groups and is prepared by reacting bi) one or more organic compounds containing at least one epoxide group and having a number average molecular weight of from about 130 to about 1000, bii) from 1.3 to 3.0 (preferably from 1.8 to 2.2, and most preferably from 1.9 to 2.1) carboxy equivalents of an organic dicarboxylic acid or anhydride having a number average molecular weight of from about 98 to about 166, and biii) 1 hydroxy equivalent of an hydroxyl group containing reaction product, prepared at a carboxy to hydroxyl equivalent ratio of from 0.6:1 to 0.95:1 of
1) (meth)acrylic acid and
2) tri- or tetrahydroxy ether alcohols having a number average molecular weight of from about 180 to about 1000 and containing at least two ethylene and/or propylene oxide units as part of an ether structure, with the ratio of reactive equivalents of components bii) through biii) to epoxide equivalents of component bi) being at least about 1:1.

As noted above, useful unsaturated epoxy (meth)acrylates are described in U.S. Pat. Nos. 5,726,255, 6,359,082 and RE 37,448.

The epoxy (meth)acrylate used is the present invention is prepared by reacting bi) an organic compound(s) containing epoxide groups with bii) from 1.3 to 3.0 carboxyl equivalents of organic dicarboxylic acid or anhydride having a molecular weight from about 98 to about 166 and biii) 1 hydroxy equivalent of OH group-containing reaction products, which are prepared at a COOH/OH equivalent ratio of 0.6:1 to 0.95:1, of 1) (meth)acrylic acid and 2) tri- or tetrahydric ether alcohols having a number average molecular weight of 180 to 1000 and containing at least two ethylene and/or propylene oxide units as part of an ether structure.

Within the context of the present invention, "compounds having epoxide groups" mean organic compounds which have a number average molecular weight ($M_n$) of from about 130 to about 1000 and contain an average of at least one (preferably from 1.5 to 6 and more preferably from 1.5 to 2) epoxide groups per molecule. An "epoxide equivalent" means the amount of epoxide compounds in grams that contains one mole of epoxide groups.

Preferred compounds having epoxide groups are those having an epoxide equivalent weight of 100 to 500. Examples include polyglycidylethers of polyhydric phenols such as pyrocatechol, resorcinol, hydroquinone, 4,4'-dihydroxydiphenylmethane, 2,2-bis-(4-hydroxyphenyl)-propane (bisphenol A), 4,4'dihydroxydiphenylcyclohexane, 4,4'-dihydroxy-diphenylsulphone, tris-(4-hydroxyphenyl)-methane and novolaks (i.e., reaction products of mono- or polyhydric phenols with aldehydes, particularly formaldehyde, in the presence of acid catalysts). Polyglycidyl ethers of bisphenol A are preferred.

Also suitable are glycidyl ethers of monoalcohols such as n-butanol or 2-ethylhexanol; glycidyl ethers of polyhydric alcohols such as butane 1,4-diol, butene 1,4-diol, hexane 1,6-diol, glycerol, trimethylolpropane, pentaerythritol and polyethylene glycols; triglycidyl isocyanurate; polyglycidyl thioethers of polyhydric thiols such as bismercaptomethylbenzene; glycidyl esters of monocarboxylic acids such as versatic acid; and glycidyl esters of polyvalent, aromatic, aliphatic and cycloaliphatic carboxylic acids such as phthalic acid diglycidyl ester, isophthalic acid diglycidyl ester, terephthalic acid diglycidyl ester, tetrahydrophthalic acid diglycidyl ester, adipic acid diglycidyl ester and hexahydrophthalic acid diglycidyl ester.

Dicarboxylic acids or dicarboxylic acid anhydrides suitable as component bii) are selected from saturated or unsaturated aliphatic dicarboxylic acids containing 4 to 10 carbon atoms such as fumaric acid, maleic acid, succinic acid, adipic acid, sebacic acid, itaconic acid and/or the corresponding anhydrides; cycloaliphatic dicarboxylic acids or dicarboxylic acid anhydrides containing 8 to 10 carbon atoms such as tetrahydrophthalic acid, hexahydrophthalic acid, norbornene dicarboxylic acid and/or anhydrides thereof; and aromatic dicarboxylic acids containing 8 carbon atoms or anhydrides thereof such as phthalic acid, phthalic acid anhydride, isophthalic acid and terephthalic acid.

Suitable dicarboxylic anhydrides are selected from saturated, aromatic or unsaturated (cyclo)aliphatic dicarboxylic anhydrides having 4 to 9 carbon atoms such as the anhydrides of maleic acid, succinic acid, phthalic acid, tetrahydrophthalic acid, hexahydrophthalic acid or norbornene dicarboxylic acid. In calculating the ratio of carboxy equivalents (component bill) to hydroxyl equivalent (component bii), one carboxylic anhydride group is equal to two carboxy groups.

Compounds suitable as component biii) are selected from OH group-containing reaction products (meth)acrylic acid with tri- or tetrahydric ether alcohols having a number average molecular weight (determined by end group analysis) of 180 to 1000 and containing at least two ethylene and/or propylene oxide units as part of an ether structure. These reaction products are prepared at a COOH/OH equivalent ratio of 0.6:1 to 0.95:1, preferably 0.65:1 to 0.90:1. The ether alcohols are obtained by the alkoxylation of suitable starter molecules in known manner. Preferred starter molecules are ether group-free tri- or tetrahydric alcohols, which correspond to the ether alcohols. Examples include glycerol, trimethylolpropane, trimethylolethane, pentaerythritol and mixtures thereof. The ether alcohols preferably have a degree of alkoxylation of 2 to 20, more preferably 2 to 15. The degree of alkoxylation refers to the average number of moles of ethylene oxide and/or propylene oxide which have been added onto 1 mole of an alcohol used as starter molecule.

The reaction between components biii) 1) and biii) 2) takes place according to known methods, e.g., by azeotropic esterification of (meth)acrylic acid with the ether alcohols.

The reaction of the epoxides with compounds bii) and biii) can also take place in one step, for example, according to the processes of DE-OS 2,429,527 and DE-A 2,534,012 (which correspond to U.S. Pat. Nos. 4,253,198 and 4,081, 492, respectively, the entire contents of both of which are herein incorporated by reference), optionally in the presence of solvent. Suitable solvents include inert solvents such as butyl acetate, toluene, cyclohexane and mixtures thereof. If desired, components bii) and biii) can be reacted before being reacted with the epoxide group-containing compound (see, e.g. U.S. Pat. No. 5,726,255 and U.S. RE 37,448). The reaction is generally carried out in the presence of about 0.01 to 3 wt. %, based on the epoxide, of catalysts such as tertiary amines, quaternary ammonium salts, alkali hydroxides, alkali salts of organic carboxylic acids, mercaptans, dialkyl sulphides, sulphonium or phosphonium compounds and phosphines. The use of quaternary ammonium salts such as triethylbenzylammonium chloride is particularly preferred. The reaction takes place at 20 to 120° C., preferably 40 to 90° C.

The epoxy(meth)acrylates may optionally be modified with basic nitrogen compounds in a amount sufficient to provide up to 0.3 NH equivalents per epoxide equivalent. The modification reaction may be carried out before or after the epoxide reaction with components bii) and biii). Suitable basic nitrogen compounds include ammonia, (cyclo)aliphatic primary or secondary mono- or polyamines, preferably having a molecular weight of 31 to 300. Examples of primary amines include mono- and diamines such as methylamine, n-butylamine, n-hexylamine, 2-ethylhexylamine, cyclohexylamine, ethanolamine, benzylamine, ethylene diamine, the isomeric diaminobutanes, the isomeric diaminohexanes and 1,4-diaminocyclohexane. Examples of secondary amines include dimethylamine, diethylamine, diethanolamine, diisopropanolamine, N-methylethanolamine and N-cyclohexylisopropylamine.

The reaction of the epoxide groups with the nitrogen compounds may optionally take place in the presence solvents such as those previously set forth. The reaction is preferably carried out in the absence of solvent. The reaction temperature is 20 to 120° C., preferably 40 to 90° C.

The quantities of starting compounds are chosen such that the reaction leads to essentially complete conversion of the epoxide groups originally present.

In order to protect the polymerizable reaction products according to the invention from unwanted premature polymerization, it is advisable to add, during the preparation process, 0.001 to 0.2 wt. %, based on the total reaction mixture including auxiliaries and additives, of polymerization inhibitors or antioxidants, such as phenols and phenol derivatives, preferably sterically hindered phenols. Other suitable stabilizers are described in "Methodender organischen Chemie" (Houben-Weyl), 4th edition, vol. XIV/1, page 433-452, 756, Georg Thieme Verlag, Stuttgart, 1961, and include 2,6-di-tert.-butyl-p.-cresol, hydroquinone monomethylether and/or phenothiazine.

Component C

The compositions of the present invention can also contain one or more reactive diluents in an amount of from 0 to about 90% by weight, where the % by weight is based on the total combined amounts of components A) and B). The reactive diluents are selected from the group comprising of from 0 to about 100% by weight, preferably from about 10 to about 90% by weight, and most preferably from about 25 to about 75% by weight, of $C_1$-$C_{10}$-alkyl or $C_6$-$C_{10}$-aryl (meth)acrylate.

Component D

Component D), the photoinitiator, can be substantially any photoinitiator. A variety of photoinitiators can be utilized in the radiation-curing compositions of the present invention. The usual photoinitiators are the type that generate free radicals when exposed to radiation energy. Suitable photoinitiators include, for example, aromatic ketone compounds, such as benzophenones, alkylbenzophenones, Michler's ketone, anthrone and halogenated benzophenones. Further suitable compounds include, for example, 2,4,6-trimethylbenzoyldiphenylphosphine oxide, phenylglyoxylic acid esters, anthraquinone and the derivatives thereof, benzil ketals and hydroxyalkylphenones. Illustrative of additional suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene 9,10-dichloroanthracene; 4,4-dichlorobenzophenone; thioxanthone; isopropylthioxanthone; methylthioxanthone; $\alpha,\alpha,\alpha$-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; maleimides and their derivatives; and mixtures thereof. There are several suitable photoinitiators commercially available from Ciba including Irgacure® 184 (1-hydroxy-cyclohexyl-phenyl-ketone), Irgacure® 819 (bis (2,4,6-trimethylbenzoyl)-phenylphosphineoxide), Irgacure® 1850 (a 50/50 mixture of bis(2,6-dimethoxybenzoyl)-2,4,4-trimethylpentyl-phosphine oxide and 1-hydroxy-cyclohexyl-phenyl-ketone), Irgacure® 1700 (a 25/75 mixture of bis(2,6-dimethoxybenzoyl)-2,4,4-trimethylpentyl-phosphine oxide and 2-hydroxy-2-methyl-1-phenyl-propan-1-one), Irgacure® 907 (2-methyl-1[4-(methylthio)phenyl]-2-morpholonopropan-1-one), Darocur MBF (a phenyl glyoxylic acid methyl ester), Irgacure® 2022 Photoinitiator blend (20% by weight of phenylbis(2,3,6-trimethyl benzoyl) phosphine oxide and 80% by weight of 2-hydroxy-2-methyl-1-phenyl-1-propanone) and Darocur 4265 (a 50/50 mixture of bis(2,4,6-trimethylbenzoyl)-phenylphosphineoxide and 2-hydroxy-2-methyl-1-phenyl-propan-1-one). The foregoing lists are meant to be illustrative only and are not meant to exclude any suitable photoinitiators. Those skilled in the art will know the concentrations at which photoinitiators are effectively employed and generally the concentration will not exceed about 10% by weight of the radiation-curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxypropane, and mixtures thereof.

Curing may also take place in the presence of compounds that generate free radicals such as (hydro)peroxides, optionally in the presence of accelerators and cationically in the presence of superacids such as the phenyl sulfonium metal salts.

Component E

The compositions of the present invention can also contain one or more solvents in an amount of from 0 to about 90% by weight, where the % by weight is based on the total combined amounts of components A) and B). The solvent must be inert with any and all of the other components. Useful solvents include $C_5$-$C_8$ aliphatic and cycloaliphatic compounds, fluorinated and/or chlorinated hydrocarbons, aliphatic esters, aliphatic ethers and ketones and known aromatic solvents. Specific examples of useful solvents include ethyl acetate, butyl acetate, toluene, hexane, heptane, cyclohexane, acetone, methyl ethyl ketone, methyl isobutyl ketone, methyl n-amyl ketone, isopropanol, ethylene glycol monobutyl ether, diethylene glycol monobutyl ether and solvent naptha. The formulations with or without solvents can also be loaded into aerosol containers.

The coating prepared using the process described above can be applied by conventional spray application and cured using radiation sources. This direct-to-metal coating does not need primers and has excellent adhesion to various metal substrates like cold-rolled steel, sand-blasted steel, new or weathered galvanized steel, aluminum and metal alloys. Moreover this coating could also act as a tie-coat for topcoats that have difficulty adhering to metal substrates.

Other Additives

As is known in the art and depending on the application for the coating, additional additives can be used. Such additives include dispersing agents, flow aid agents, thickening agents, defoaming agents, deaerating agents, pigments, fillers, flattening agents and wetting agents. In addition, where the article to be coated is of such a shape that portions of the coating may not be exposed to radiation, it is possible to add materials which crosslink through carboxyl, hydroxyl, amino groups or moisture. Such materials include carbodiimides, aziridines, polyvalent cations, melamine/formaldehyde, epoxies, and isocyanates. When used, such crosslinkers should be used in an amount of from 0.1 to 35% by weight based on the combined weight of components A) and B).

Applying and Curing

Generally, components A) and B) are first mixed together and then component C), D), E) and any other additives are added thereto. The composition of the invention may be applied onto the most varied substrates by spraying, rolling, knife-coating, pouring, brushing, dipping, putty knife or squeegee. Any solvent present may be then flashed off in an ambient environment or by baking in a conventional oven at a temperature of from about 20 to about 110° C. preferably from about 35 to about 60° C. for period of from about 1 to about 10 minutes preferably from about 4 to 8 minutes. The solvent can also be flashed off using radiation sources like infra-red or microwave.

Once the solvent is flashed off or has baked off to a suitable level, the coated substrate is subjected to UV radiation having a wavelength between 200 nm and 450 nm. The distance between the surface and the radiation source will depend upon the intensity of the light source. The length of time the coated substrate is subjected to the radiation will depend on the intensity and wavelength of the radiation, the distance from the radiation sources, solvent content in the formulation, temperature and the humidity of the cure surroundings but will generally be less than 15 minutes and may be as short as 0.1 second.

The cured coatings are distinguished by their solvent resistance adhesion characteristics.

As noted above, the compositions are also curable using radiation sources having wavelengths of at least 200 nm and preferably from about 220 to about 420 nm. The radiation can be provided by any suitable source such as UV lamps having with or reduced infrared emission or UV lamps fitted with filters to eliminate infrared emissions or so-called LEDs (light-emitting devices) emitting radiation in the wavelength noted. Particularly useful commercially available devices include: the Fusion and Nordson high-intensity microwave powered lamps (mercury, iron doped and gallium doped lamps), high-intensity standard arc lamps, the Panacol UV H-254 lamp (available from Panacol-Elosol GmbH)—a 250 W ozone-free, iron doped metal halide lamp with spectral wavelength of from 320 to 450 nm; Panacol UVF-450 (320 nm to 450 nm depending on the black, blue or clear filter used); Honle UVA HAND 250 CUL (available from Honle UV America Inc)—emitting maximum intensity UVA range of ~320 to 390 nm; PMP 250 watt metal halide lamp (available from Pro Motor Car Products Inc); Cure-Tek UVA-400 (available from H&S Autoshot) which has a 400-watt metal halide bulb and the lamp assembly can be fitted with different filters like blue, light blue or clear to control/eliminate the infra-red radiation from the lamp source); Con-Trot-Cure Scarab-250 UV-A shop lamp system (available from UV Process Supply Inc—has a 250 W iron doped metal halide lamp with a spectral wavelength output of 320 to 450 nm); Con-Trot-Cure—UV LED Cure-All 415 (available from UV Process Supply Inc.—spectral wavelength of 415 nm with a 2.5 to 7.95 W operating wattage range); Con-Trot-Cure—UV LED Cure-All 390 (available from UV Process Supply Inc.—spectral wavelength of 390 nm with a 2.76 to 9.28 W operating wattage range); UV H253 UV lamp (available from UV Light Technologies—the unit contained a 250 W iron doped metal halide lamp fitted with a black glass filter to produce a spectral wavelength of between 300 and 400 nm); Radion RX10 module curing using solid state high intensity UV light source from Phoseon Technology; Low intensity microwave UV System Model QUANT-18/36 (available from Quantum Technologies—UV Intensity range: 3-30 mW/cm2; UV Spectral range: 330-390 nm); WorkLED (available from Inretech Technologies using 400 nm LED arrays); Flashlight MC with 20×LED adapter (available from Inretech Technologies using 400 nm LEDs); and Phillips TL03 lamp with radiation output above 380 nm; and sunlight.

In one embodiment of the invention, the non-aqueous composition is applied to the substrate, then exposed to UV radiation to cure. Then, a standard two-component, polyurethane-forming composition is applied. The non-aqueous composition serves as a tie-coat to improve adhesion of the polyurethane to the metal substrate.

In an alternate embodiment of the invention, the two-component, polyurethane-forming composition may be applied before the non-aqueous composition is exposed to UV radiation.

In another alternate embodiment of the invention, the non-aqueous composition is applied to the metal substrate with an isocyanate-functional compound, prior to the application of the two-component, polyurethane-forming composition. In this embodiment, the two-component composition preferably has ratio of isocyanate groups to isocyanate-reactive groups of 20:1 to 1:20, preferably 5:1 to 1:5, more preferably 1.5:1 to 1:1.5.

In another alternate embodiment of the invention, the non-aqueous composition is applied to the metal substrate simultaneously with an —OH or —NH-functional compound, prior to the application of the two-component, polyurethane-forming composition. In this embodiment, the two-component composition preferably has ratio of isocyanate groups to isocyanate-reactive groups of one or greater than one.

Any standard, two-component, polyurethane-forming compositions that include an isocyanate-functional component and an isocyanate-reactive component and that are known in the art may be used in the method of the present invention. Suitable two-component, polyurethane-forming compositions are described in, for example, U.S. Pat. Nos. 5,154,950, 5,142,014, 5,747,629, 6,169,141, 5,821,326 and 6,236,741, the entire contents of each of which are hereby incorporated by reference.

The polyisocyanates which are suitable for use in preparing the isocyanate-functional component may be monomeric polyisocyanates, polyisocyanate adducts or isocyanate-terminated prepolymers. The polyisocyanate adducts are generally prepared from monomeric polyisocyanates, preferably monomeric diisocyanates and contain biuret, allophanate, urea, urethane, carbodiimide or uretdione groups or isocyanurate rings. Suitable polyisocyanates which may be used as the monomeric polyisocyanates or for preparing the polyisocyanate adducts include organic diisocyanates represented by the general formula $R(NCO)_2$ in which R represents an organic group obtainable by removal of the isocyanate groups from an organic diisocyanate having a molecular weight of from about 112 to 1,000, and preferably from about 140 to 400. Preferred diisocyanates are those represented by the general formula indicated above in which R represents a divalent aliphatic hydrocarbon group having from 4 to 18 carbon atoms, a divalent cycloaliphatic hydrocarbon group having from 5 to 15 carbon atoms, a divalent aralilphatic hydrocarbon group having from 7 to 15 carbon atoms or a divalent aromatic hydrocarbon group having 6-15 carbon atoms. Examples of the organic diisocyanates which are particularly suitable for the process include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluoylene diisocyanate, 1,3- and/or 1,4-phenylene diisocyanate, 2,4- and/or 2,6-toluoylene diisocyanate, 2,4- and/or 4,4'-diphenylmethane diisocyanate and 1,5-diisocyanato naphthalene. Also suitable are polyisocyanates such as 4,4', 4"-triphenylmethane triisocyanate and polyphenyl polymethylene polyisocyanates obtained by phosgenating aniline/formaldehyde condensates. Mixtures of diisocyanates and/or polyisocyanates may, of course, also be used. Preferred diisocyanates are 1,6-hexamethylene diisocyanate, isophorone diisocyanate, bis-(4-isocyanatocyclohexyl)-methane, 2,4- and/or 2,6-toluoylene diisocyanate and 2,4'- and/or 4,4'-diphenylmethane diisocyanate.

Polyisocyanate adducts containing biuret groups may be prepared from the previously mentioned diisocyanates according to the processes disclosed in U.S. Pat. No. 3,124,605; 3,358,010; 3,644,490; 3,862,973; 3,903,126; 3,903,127; 4,051,165; 4,147,714 or 4,220,749 by using co-reactants such as water, tertiary alcohols, primary and secondary monoamines, and primary and/or secondary diamines. The preferred diisocyanate to be used in these processes is 1,6-diisocyanatohexane.

Polyisocyanate adducts containing allophanate groups may be prepared by reacting the previously mentioned diisocyanates according to the processes disclosed in U.S. Pat. Nos. 3,769,318 and 4,160,080, British Patent 994,890 and German Offenlegungsschrift 2,040,645. Low surface energy polyisocyanate adducts containing allophanate groups may be prepared according to U.S. Pat. No. 5,747,629.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992; 4,288,586; and 4,324,879; German Auslegeschrift 1,150,080; German Offenlegungsschrift 2,325,826; and British Patent 1,465,812. The preferred diisocyanates to be used are 1,6-diisocyanatohexane, isophorone diisocyanate and mixtures of these diisocyanates.

Polyisocyanate adducts containing urea or preferably urethane groups and based on the reaction product of the previously mentioned diisocyanates and compounds having a molecular weight of less than 400 and containing 2 or more isocyanate-reactive hydrogens may be prepared according to the process disclosed in U.S. Pat. No. 3,183,112. When preparing polyisocyanate adducts using a large excess of diisocyanate, the average isocyanate functionality may be determined from the functionality of the compounds containing isocyanate-reactive hydrogens. For example, theoretically when an excess of a diisocyanate is reacted with a diol, a polyisocyanate with a functionality of approximately 2 will be produced, while a triol co-reactant will result in a polyisocyanate functionality of at least 3. By using mixtures of compounds containing isocyanate-reactive hydrogens, various functionalities can be obtained. The preferred isocyanate-reactive hydrogens are provided by hydroxyl groups, although other groups such as amino groups are not excluded. Suitable compounds containing isocyanate-reactive hydrogens are disclosed in U.S. Pat. No. 3,183,112, incorporated herein by reference, and include ethylene glycol, 1,2- and 1,3-propylene glycol, 1,3- and 1,4-butanediol, 1,6-hexanediol, 1,8-octanediol, neopentyl glycol, diethylene glycol, 2-methyl-1,3-propylene glycol, 2,2-dimethyl-1,3-propylene glycol, the various isomeric bis-hydroxymethyl cyclohexanes, 2,2,4-trimethyl-1,3-pentanediol, glycerine, trimethylol propane, ethylene diamine, diethylene triamine, triethylene tetraamine, 1,6-hexanediamine, piperazine, 2,5-dimethyl piperazine, 1-amino-3-aminomethyl-3,5,5-trimethylcyclohexane, bis(4-aminocyclohexyl)methane, bis(4-amino-3-methylcyclohexyl)methane, 1,4-cyclohexanediamine, 1,2-propanediamine, hydrazine, aminoacid hydrazides, hydrazides of semicarbazido carboxylic acids, bis-hydrazides bis-semicarbazides. 1,3- and 1,4-butanediol, 2,2,4-trimethyl-1,3-pentanediol, trimethylol propane and mixtures thereof are particularly preferred. It is also possible to use any of the previously described polyisocyanate adducts for the further preparation of polyisocyanate adducts containing urethane or urea groups. Preferred diisocyanates are 1,6-hexamethylene diisocyanate, isophorone diisocyanate and mixtures of these diisocyanates.

In addition to using the previously described monomeric polyisocyanates or polyisocyanate adducts for preparing the polyisocyanate component of the present invention, it is also suitable to prepare the polyisocyanate component from isocyanate-terminated prepolymers. These prepolymers are formed by reacting an excess of the previously described polyisocyanates, preferably monomeric diisocyanates, with high molecular weight isocyanate-reactive compounds and optionally low molecular weight isocyanate-reactive compounds. Prepolymers prepared exclusively from polyisocyanates and low molecular weight isocyanate-reactive compounds are referred to as polyisocyanate adducts containing urea and/or urethane groups and have previously been discussed. A sufficient excess of the polyisocyanate should be used to ensure that the prepolymers are terminated with isocyanate groups.

It should also be ensured that the isocyanate-terminated prepolymers remain soluble in the commonly used polyurethane solvents and do not gel. Gelation may result when sufficiently cross-linked, isocyanate-terminated prepolymers are prepared from polyisocyanates or isocyanate-reactive compounds containing more than two reactive groups. Minimal amounts of branching do not lead to gelation; however, once a sufficient cross-link density is achieved, gelation occurs. The critical cross-link density, commonly referred to as the gel point, may be calculated by known methods or readily determined by simply reacting the desired components and observing whether gel particles form. In order to avoid gelation, it is preferred to prepare the isocyanate-terminated prepolymers from monomeric diisocyanates rather than from higher functional polyisocyanates. It is additionally preferred to prepare the isocyanate-terminated prepolymers from high molecular weight isocyanate-reactive compounds which do not contain excessive amounts of branching in order to further reduce the possibility that gelation will occur. Finally, it is preferred to prepare the isocyanate-terminated prepolymers by adding the isocyanate-reactive compound to the polyisocyanate since this helps to maintain an excess of isocyanate groups throughout the formation of the prepolymer.

Suitable compounds having isocyanate-reactive groups include, but are not limited to diols, polyols, di- and polyamines, and polyaspartic esters. They include, for example:

1) Polyhydroxyl polyesters which are obtained from polyhydric, preferably dihydric alcohols to which trihydric alcohols may be added, and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be saturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bis-glycol terephthalate. Suitable polyhydric alcohols include the polyhydric alcohols previously set forth for preparing the polyisocyanate adducts containing urea or urethane groups, 2) Polylactones generally known from polyurethane chemistry, e.g., polymers obtained by the ring-opening polymerization of ε-caprolactone initiated with the above-mentioned polyhydric alcohols.

3) Polycarbonates containing hydroxyl groups such as the products obtained from the reaction of the polyhydric alcohols previously set forth for preparing the polyisocyanate adducts containing urea or urethane groups, preferably dihydric alcohols such as 1,3-propanediol, 1,4-butanediol, 1,4-dimethylol cyclohexane, 1,6-hexanediol, diethylene glycol, triethylene glycol or tetraethylene glycol with phosgene, diaryl carbonates such as diphenyl carbonate or cyclic carbonates such as ethylene or propylene carbonate. Also suitable are polyester carbonates obtained from the reaction of lower molecular weight oligomers of the above-mentioned polyesters or polylactones with phosgene, diaryl carbonates or cyclic carbonates.

4) Polyethers include the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Suitable starting compounds containing at least one reactive hydrogen atom include the polyols set forth as suitable for preparing the polyisocyanate adducts containing urethane or urea groups and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone and 1,1,1- or 1,1,2-tris(hydroxylphenyl)ethane. Polyethers which have been obtained by the reaction of starting compounds containing amino groups can also be used, but are less preferred for use in the present invention. Suitable amine starting compounds include those set forth as suitable for preparing the polyisocyanate adducts containing urethane or urea groups and also ammonia, methylamine, tetramethylenediamine, ethanolamine, diethanolamine, triethanolamine, aniline, phenylenediamine, 2,4- and 2,6-toluoylenediamine, polyphenylene polymethylene polyamines of the kind obtained by the aniline/formaldehyde condensation reaction and mixtures thereof. Resinous materials such as phenol and cresol resins may also be used as the starting materials. The preferred starting compounds for the polyethers are those compounds which exclusively contain hydroxyl groups, while compounds containing tertiary amine groups are less preferred and compounds containing isocyanate-reactive-NH groups are much less preferred.

Polyethers modified by vinyl polymers are also suitable for the process according to the invention. Products of this kind may be obtained by polymerizing, e.g., styrene and acrylonitrile in the presence of polyethers (U.S. Pat. Nos. 3,383,351; 3,304,273; 3,523,095; and 3,110,695; and German Patent No. 1,152,536). Also suitable as polyethers, although less preferred, are amino polyethers, e.g., wherein at least a portion of the hydroxyl groups of the previously described polyethers are converted to amino groups.

5) Polythioethers such as the condensation products obtained from thiodiglycol on its own and/or with other glycols, dicarboxylic acids, formaldehyde, amino carboxylic acids or amino alcohols. The products are either polythio mixed ethers, polythio ether esters, or polythioether ester amides, depending on the co-components.

6) Polyacetals including those obtained from the above-mentioned polyhydric alcohols, especially diethylene glycol, triethylene glycol, 4,4'-dioxyethoxy-diphenyl-dimethylene, 1,6-hexanediol and formaldehyde. Polyacetals suitable for use in the invention may also be prepared by the polymerization of cyclic acetals.

7) Polyether esters containing isocyanate-reactive groups which are known in the art.

8) Polyester amides and polyamides including the predominantly linear condensates obtained from polyvalent saturated and unsaturated carboxylic acids or their anhydrides and polyvalent saturated and unsaturated amino alcohols, diamines, polyamines, or mixtures thereof.

9) The polyhydroxy polyacrylates generally have a molecular weight, as determined by vapor pressure osmometry of 232 to about 100,000, preferably about 1000 to 80,000, more preferably about 2000 to 50,000, and a hydroxyl group content of about 0.017 to 15% by weight, preferably about 0.1 to 10% by weight and more preferably about 0.5 to 5% by weight. The polyhydroxy polyacrylates preferably have at least two alcoholic hydroxyl groups per molecule as a statistical average although in principle it would be possible to use the corresponding monohydroxyl compounds. The average functionality of the polyhydroxy polyacrylates may be as high as 15. The molecular weights indicated for the polyacrylates containing hydroxyl groups are number average molecular weights and not weight average molecular weights which may be determined by light scattering. These polyhydroxy polyacrylates are known and may be prepared by known methods such as those described in European Patent Office Publication 68,383, German Patentschrift 2,460,329, British Patent 1,515,868, U.S. Pat. Nos. 3,002,959, 3,375,227 or German Auslegeschrift 1,038,754. The polyhydroxy polyacrylates are generally prepared by the radical polymerization or copolymerization of a hydroxyalkyl ester of an unsaturated carboxylic acid, preferably acrylic or methacrylic acid, with itself or preferably together other hydroxyl-free unsaturated monomers.

Suitable hydroxyalkyl esters include esters containing 2 to 8, preferably 2 to 4 carbon atoms in the alkyl group and obtained from β,α-unsaturated carboxylic acids having 3 to 5 carbon atoms, such as acrylic, methacrylic, fumaric, maleic, itaconic or crotonic acid. The acrylic and methacrylic acid esters are preferred. Hydroxyalkyl esters of the above-mentioned acids containing ether bridges in the alkyl groups may also be used but are less preferred. The particularly preferred monomers with alcoholic hydroxyl groups include the 2-hydroxyethyl-, 2- and 3-hydroxypropyl-, and 2-, 3- and 4-hydroxybutylacrylates and -methacrylates. These monomers containing alcoholic hydroxyl groups may be prepared, for example, by the reaction of the above-mentioned acids with epoxides such as alkylene or propylene oxide.

Also suitable are hydroxyalkyl esters prepared by the addition of at least one mole of ε-caprolactone to the hydroxyalkyl esters described above.

The polyhydroxy polyacrylates which are used may also be prepared by reacting the corresponding polyacrylates containing carboxylic acid groups with alkylene oxides such as propylene oxide and/or ethylene oxide in the presence of suitable alkoxylation catalysts such as tetrabutylammonium bromide. The starting materials for this alkoxylation reaction, i.e., the polyacrylates containing carboxylic acid groups, are obtained in known manner by the copolymerization of unsaturated carboxylic acids such as acrylic acid and/or methacrylic acid with unsaturated comonomers which do not contain carboxyl or hydroxyl groups. The preferred method for preparing the polyhydroxy polyacrylates is the copolymerization of the hydroxyalkyl esters of unsaturated carboxylic acids previously set forth.

The comonomers used for the above-mentioned hydroxyl group-containing monomers may be any α,β-olefinically unsaturated compounds in the molecular weight range of 28 to 350 which are free from hydroxyl groups such as ethylene, propylene, butene-1, hexene-1, octene-1, styrene, α-methylstyrene, divinyl benzene, various isomeric vinyl toluenes, esters of α,β-unsaturated carboxylic acids of the type exemplified above with monohydric aliphatic alcohols having 1 to 18, preferably 1 to 10 carbon atoms, in particular the corresponding esters of acrylic or methacrylic acids such as the methyl, ethyl, N-butyl, N-pentyl, N-hexyl, 2-ethyl-hexyl or octadecyl esters of acrylic or methacrylic acid.

Neutral esters of polycarboxylic acids are also suitable comonomers, for example, itaconic, crotonic, maleic or fumaric esters of the monohydric alcohols exemplified above.

Acrylic acid, methacrylic acid, vinyl acetate, acrylonitrile, methacrylonitrile and dienes such as isoprene or butadiene are all suitable comonomers. Vinyl chloride may in principle also be used as a comonomer.

Particularly preferred polyhydroxy polyacrylates are obtained from about 10 to 50 parts by weight of hydroxyalkyl esters of acrylic or methacrylic acid, 0 to 80 parts by weight of styrene and/or α-methylstyrene, about 10 to 90 parts by weight of an acrylic and/or methacrylic acid ester free from hydroxyl group of the type exemplified above and 0 to about 5 parts by weight of an α,β-unsaturated mono- or dicarboxylic acid of the type exemplified, in particular acrylic acid or methacrylic acid.

The preferred high molecular weight isocyanate-reactive compounds for use in the process according to the invention are the polyhydroxyl polyethers, polyesters, polylactones, polycarbonates, polyester carbonates and especially polyacrylates.

In addition to the high molecular weight compounds, the isocyanate-terminated prepolymers may also optionally be prepared from low molecular weight isocyanate-reactive compounds having an average molecular weight of up to 400. The low molecular weight isocyanate-reactive compounds should have an average functionality of about 2 to 8, preferably from about 2 to 6 and most preferably from about 2 to 4, and may also contain ether, thioether, ester, urethane and/or urea bonds.

Examples of low molecular weight compounds include the polyamines and diols or triols used as chain lengthening agents or cross-linking agents in polyurethane chemistry such as those listed as suitable for preparing the polyisocyanate adducts containing urethane or urea groups and the polyester and polyether polyols. Additional examples include those set forth in U.S. Pat. Nos. 4,439,593 and 4,518,522, both of which are herein incorporated by reference in their entirety.

The isocyanate-reactive component may also include polyaspartic esters prepared in accordance with U.S. Pat. Nos. 5,821,326, 5,236,741 and 6,169,141.

Preparation of these two-component polyurethane compositions is well known to those of ordinary skill in the art.

EXAMPLES

The examples that follow are intended to illustrate the invention without restricting its scope. Unless otherwise indicated, all percentages and parts are by weight.

In the examples, the following materials were used:

| | |
|---|---|
| TiO$_2$ | TiO$_2$ R-960, available from DuPont |
| Tronox ®-A | Untreated anatase pigment available from Kerr-McGee Pigments GmbH & Co. |
| Epon ® 828 | Aromatic epoxy resin based on bisphenol-A and epichlorohydrin with epoxy equivalent weight of 190 available from Resolution Performance Products |
| Desmodur ® N3600 | Low viscosity Hexamethylene Diisocyanate trimer available from Bayer MaterialScience LLC |
| Barytes1 | Sparmite No. 1 Barytes - Extender pigment barium sulphate from Elementis Pigments, Inc. |
| CC | calcium carbonate, Vicron 15-15, available from Whittaker, Clark & Daniels, Inc. |
| T399 | Talc 399, available from Whittaker, Clark & Daniels, Inc. |
| B318M | an iron oxide pigment available as Bayferrox 318M from Bayer Chemical Corporation |
| CD9053 | Trifunctional acid ester adhesion promoter from Sartomer Inc. |
| IRG2022 | Photoinitiator Blend {20% by weight of Phenyl bis (2,4,6-trimethyl benzoyl) phosphine oxide (I819)and 80% by weight of 2-Hydroxy-2-methyl-1-phenyl-1-propanone (D1173)} from Ciba Specialty Chemicals |
| IRG819 | Irgacure ® 819 photoinitiator, {Phenyl bis (2,4,6-trimethyl benzoyl) phosphine oxide} available from Ciba Specialty Chemicals |

-continued

| | |
|---|---|
| Butyl acetate | Available from Aldrich |
| Desmophen® NH 1420 | Polyaspartate prepared from bis-(4-aminocyclohexyl)-methane (amine number of 195-205) available from Bayer MaterialScience LLC |
| Desmophen® NH 1520 | Polyaspartate ester (amine number of 185-195) available from Bayer MaterialScience LLC |
| Desmolux® U 100 | Aliphatic Polyether-based Urethane Acrylate available from Bayer MaterialScience LLC |
| Desmolux® XP2683 | Aliphatic Polyester-based Urethane Acrylate available from Bayer MaterialScience LLC |
| Desmolux® XP 2266 | Epoxy ester acrylate (MW of about 700 g/mol) available from Bayer MaterialScience LLC |
| Nytal 3300 | Industrial talc from R. T. Vanderbilt Company, Inc. |
| Ucar VROH | Hydroxyl modified vinyl chloride-vinyl acetate copolymer Hydroxy number 66 from Dow Chemical Company |
| Desmophen® A LS 2945 | polyacrylate and polyester resin in 30% Butyl acetate (hydroxyl number 93) available from Bayer MaterialScience LLC |
| PEA | Phenoxy Ethyl Acrylate (monofunctional Aromatic monomer Acrylate) from Sartomer |
| HDDA | 1,6 Hexanediol Diacrylate (Difunctional monomer) from Sartomer |
| Exxate 600 | Solvent from Exxon |
| Anti-TerraU | Solutions of a salt of unsaturated polyamine amides and lower molecular weight acid polymers from BYK |
| L 207A Novacite | Silicon Dioxide from Malvern Minerals Company |
| Desmodur® XP 2410 | Low viscosity aliphatic polyisocyanate based on Hexamethylene Diisocyanate (% NCO 24) from Bayer |
| Desmodur® N 3300 | Isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mpa.s available from Bayer MaterialScience LLC |
| Desmodur® N 3390 | Aliphatic polyisocyanate based on Hexamethylene Diisocyanate (90% solids) available from Bayer MaterialScience LLC |
| Aromatic 100 | Solvent from Exxon |
| Desmolux® UVXP 2337 | Polyisocyanate bearing urethane acrylate (% NCO 12.5) available from Bayer MaterialScience LLC |
| Desmophen® 2089 | Hydoxyl-functional polyester in 255 Butyl Acetate (double bond-containing polyol with hydroxy number 198 available from Bayer MaterialScience LLC) |
| Desmodur® E 21 | Aromatic polyisocyanate prepolymer based on MDI (% NCO 16) available from Bayer MaterialScience LLC |
| Desmodur® Z4470 SN | Aliphatic Polyisocyanate based on IPDI (in 30% Aromatic 100 solvent) {11.7% NCO} available from Bayer MaterialScience LLC |

Example 1

37 parts by weight of Desmolux® U 100 and 2.8 parts by weight of IRG2022 and were mixed together well. Then 27.95 parts by weight of Barytes1, 4.44 parts by weight of B318M, 2.8 parts of TiO2 and 3.8 parts of CD9053 were added slowly to the resin mixture with continued stirring. The solvent butyl acetate 27.25 parts was added to adjust the formulation to spray viscosity. The prepared formulation was de-aerated overnight. The formulation was then applied to cold rolled steel and galvanized steel substrates by spraying with a Binks Model#2001 air-type siphon gun (air pressure 38-40 psi) to a wet film thickness of 4 mils. The sprayed panels were flashed at room temperature for 4 minutes and then cured under a forced air oven. The coatings were cured with a Fusion microwave powered unit using the Gallium doped lamp, followed by the mercury lamp at 20 feet/min. The energy density output was 1800 mJ/cm2. The resulting coating had a dry film thickness of 1.8 to 2.0 mils. The formulations had excellent adhesion to cold rolled steel as measured by crosshatch test (ASTM D3359-95 and General Motors GM 9071P Tape Adhesion Tests). It exhibited excellent hiding. The coating passed 250 hours of salt-fog resistance over cold rolled steel (ASTM D1654-79A). The coating applied over galvanized steel also passed 250 hours of humidity resistance (ASTM D4366).

Example 2

17.93 parts by weight of Desmolux® U 100, 17.93 parts by weight of Desmolux® XP 2266 and 2.8 parts by weight of IRG2022 and were mixed together well. Then 23.68 parts by weight of Barytes1, 7.18 parts by weight of B318M and 3.58 parts of CD9053 were added slowly to the resin mixture with continued stirring. The solvent butyl acetate 26.9 parts was added to adjust the formulation to spray viscosity. The prepared formulation was de-aerated overnight. The formulation was then applied to cold rolled steel and galvanized steel substrates by spraying with a Binks Model#2001 air-type siphon gun (air pressure 38-40 psi) to a wet film thickness of 4 mils. The sprayed panels were flashed at room temperature for 4 minutes and then cured under a forced air oven. The coatings were cured with a Fusion microwave powered unit using the Gallium doped lamp, followed by the mercury lamp at 20 feet/min. The energy density output was 1800 mJ/cm2. The resulting coating had a dry film thickness of 1.8 to 2.0 mils. The formulations had excellent adhesion to cold rolled steel as measured by crosshatch test (ASTM D3359-95 and General Motors GM 9071P Tape Adhesion Tests). It exhibited excellent hiding. The coating passed 250 hours of salt-fog resistance over cold roll steel (ASTM D1654-79A). The coating applied over galvanized steel passed 400 hours of humidity resistance (ASTM D4366).

Example 3

28.65 parts by weight of Desmolux® XP2683, 17.65 parts by weight of Desmolux® XP 2266 and 3.52 parts by weight of IRG2022 and were mixed together well. Then 25.21 parts by weight of T399, 0.15 parts by weight of B318M, 0.97 parts by weight of TiO2, 2.86 parts of CD9053, 10.75 parts by weight of PEA and 10.75 parts by weight of HDDA were added slowly to the resin mixture with continued stirring. The prepared solvent-free formulation was de-aerated overnight. The formulation was then applied to cold rolled steel and galvanized steel substrates by spraying with a Binks Model#2001 air-type siphon gun (air pressure 38-40 psi) to a wet film thickness of 3 mils. The coatings were then cured with a Fusion microwave powered unit using the Gallium doped lamp, followed by the mercury lamp at 20 feet/min. The energy density output was 1800 mJ/cm2. The resulting coating had a dry film thickness of 1.8 to 2.0 mils. The formulations had excellent adhesion to cold rolled steel as measured by crosshatch test (ASTM D3359-95 and General Motors GM 9071P Tape Adhesion Tests). It exhibited excellent hiding. The coating passed 250 hours of salt-fog resistance over cold roll steel (ASTM D1654-79A). The coating applied over galvanized steel passed 1000 hours of humidity resistance (ASTM D4366).

Example 4

32.01 parts by weight of Desmolux® XP2683 and 3.94 parts by weight of IRG 2022 and were mixed together well. Then 28.2 parts by weight of Barytes1, 8.65 parts by weight of B318M, 3.2 parts of CD9053, 12 parts by weight of PEA and 12 parts by weight of HDDA were added slowly to the resin mixture with continued stirring. The prepared solvent-free formulation was de-aerated overnight. The formulation was then applied to cold rolled steel and galvanized steel substrates by spraying with a Binks Model #2001 air-type siphon gun (air pressure 38-40 psi) to a wet film thickness of 3 mils. The coatings were then cured with a Fusion microwave powered unit using the Gallium doped lamp, followed by the mercury lamp at 20 feet/min. The energy density output was 1800 mJ/cm2. The resulting coating had a dry film thickness of 1.8 to 2.0 mils. The formulations had excellent adhesion to cold rolled steel as measured by crosshatch test (ASTM D3359-95 and General Motors GM 9071P Tape Adhesion Tests). It exhibited excellent hiding. The coating passed 250 hours of salt-fog resistance over cold roll steel (ASTM D1654-79A). The coating applied over galvanized steel passed 500 hours of humidity resistance (ASTM D4366).

Example 5

The formulation of Example 4 was applied and cured over galvanized steel panel in the same manner. A standard 2K polyurethane topcoat was prepared and applied on top of the UV coating as follows. 33 parts by weight of Desmophen® A LS 2945, 0.012 parts of grinding aid Anti-TerraU, 38 parts TiO2, 2.7 parts of filler L 207A Novacite and 1.1 parts of UV stabilizers were ground to 7 hegman on a Cowls dispersator. The paint paste was then let down using the 10.9 parts Exxate 600 solvent and 2 parts of Methyl n-amyl Ketone. Then 12.4 parts of Desmodur® N 3300 was added and the formulation was then applied over the UV cured coating using a Binks Model #2001 air-type siphon gun (air pressure 38-40 psi) to a wet film thickness of 4 mils. The sprayed panels were flashed at room temperature for 14 days. The formulations had good intercoat adhesion to the UV coating as measured by crosshatch test (ASTM D3359-95 and General Motors GM 9071P Tape Adhesion Tests).

Example 6

The formulation of Example 4 was applied and cured over a galvanized steel panel in the same manner. A 2K polyaspartic ester topcoat was prepared and applied on top of the UV coating as follows.

5.1 parts by weight of Desmophen NH 1420, 9.5 parts Desmophen® NH 1520 and 6.2 parts by weight of Ucar VROH were mixed together well in 19.4 parts of Methyl Ethyl Ketone. Then 29.4 parts of TiO2 and 11.2 parts of filler Nytal 3300 Industrial talc from R. T. Vanderbilt Company, Inc. were added slowly to the resin grinding cowls with continued stirring. Then 3.45 parts of solvent butyl acetate was added to adjust the formulation to spray viscosity. Then 13.2 parts of the crosslinker Desmodur® XP 2410 was added to the formulation and applied over the UV coating using a Binks Model#2001 air-type siphon gun (air pressure 38-40 psi) to a wet film thickness of 4 mils. The sprayed panels were flashed at room temperature and cured for 14 days. The formulations had good intercoat adhesion to the UV tiecoat as measured by crosshatch test (ASTM D3359-95).

Example 7

The formulation of Example 4 was applied and cured over a galvanized steel panel in the same manner. A moisture cure polyurethane topcoat was prepared and applied on top of the UV coating as follows. 85.5 parts by weight of Desmodur® N 3390, 0.12 parts by weight of T12 and 14.3 parts of Aromatic 100 Solvent were mixed together well with continued stirring. Then 27.25 parts of the solvent butyl acetate was added to adjust the formulation to spray viscosity. The formulation was then applied over the UV coating by spraying with a Binks Model#2001 air-type siphon gun (air pressure 38-40 psi) to a wet film thickness of 4 mils. The sprayed panels were flashed and cured at room temperature for 14 days. The formulations had excellent adhesion to the tiecoat as measured by crosshatch test (ASTM D3359-95).

Example 8

To 100 parts of the formulation described in shown in Example 4, 5.3 parts of Desmolux® UVXP 2337 was added to the formulation and applied to cold rolled steel and galvanized steel substrates by spraying with a Binks Model #2001 air-type siphon gun (air pressure 38-40 psi) to a wet film thickness of 4 mils. The sprayed panels were flashed at room temperature for 4 minutes and then cured under a forced air oven. The coatings were cured with a Fusion microwave powered unit using the Gallium doped lamp, followed by the mercury lamp at 20 feet/min. The energy density output was 1800 mJ/cm2. The resulting coating had a dry film thickness of 1.8 to 2.0 mils. Then the pigmented 2K polyaspartic ester coating described in Example 6 was applied immediately on top of the NCO-rich UV coating and cured as described earlier. The formulations had excellent adhesion to cold rolled steel and galvanized steel and intercoat adhesion as measured by crosshatch test (ASTM D3359-95).

Example 9

To 100 parts of the formulation described in shown in Example 4, 5.3 parts of Desmodur® E 21 was added to the formulation and applied to cold rolled steel and galvanized steel substrates by spraying with a Binks Model #2001 air-type siphon gun (air pressure 38-40 psi) to a wet film thickness of 4 mils. The sprayed panels were flashed at room temperature for 4 minutes and then cured under a forced air oven. The coatings were Model #2001 air-type siphon gun (air pressure 38-40 psi) to a wet film thickness of 4 mils. The sprayed panels were flashed at room temperature for 4 minutes and then cured under a forced air oven. The coatings were cured with a Fusion microwave powered unit using the Gallium doped lamp, followed by the mercury lamp at 20 feet/min. The energy density output was 1800 mJ/cm2. The resulting coating had a dry film thickness of 1.8 to 2.0 mils. Then the pigmented 2K polyaspartic ester coating described in Example 6 was applied immediately on top of the OH-rich UV coating and cured as described earlier. The formulations had excellent adhesion to cold rolled steel and intercoat adhesion as measured by crosshatch test (ASTM D3359-95).

Example 12

To 100 parts of the formulation described in Example 4, 5.3 parts of Desmophen® NH 1420 was added to the formulation and applied to cold rolled steel and galvanized steel substrates by spraying with a Binks Model #2001 air-type siphon gun (air pressure 38-40 psi) to a wet film thickness of 4 mils. The sprayed panels were flashed at room temperature for 4 minutes and then cured under a forced air oven. The coatings were cured with a Fusion microwave powered unit using the Gallium doped lamp, followed by the mercury lamp at 20 feet/min. The energy density output was 1800 mJ/cm2. The resulting coating had a dry film thickness of 1.8 to 2.0 mils. Then the pigmented 2K polyaspartic ester coating described in Example 6 was applied immediately on top of the NH-rich UV coating and cured as described earlier. The formulations had excellent adhesion to cold rolled steel and intercoat adhesion as measured by crosshatch test (ASTM D3359-95).

Although the invention has been described in detail in the foregoing for the purpose of illustration, it is to be understood that such detail is solely for that purpose and that variations can be made therein by those cured with a Fusion microwave powered unit using the Gallium doped lamp, followed by the mercury lamp at 20 feet/min. The energy density output was 1800 mJ/cm2. The resulting coating had a dry film thickness of 1.8 to 2.0 mils. Then the pigmented 2K polyaspartic ester coating described in Example 6 was applied immediately on top of the NCO-rich UV coating and cured as described earlier. The formulations had excellent adhesion to cold rolled steel and galvanized steel and excellent intercoat adhesion as measured by crosshatch test (ASTM D3359-95).

Example 10

To 100 parts of the formulation described in shown in Example 4, 5.3 parts of Desmodur® Z4470SN was added to the formulation and applied to cold rolled steel and galvanized steel substrates by spraying with a Binks Model #2001 air-type siphon gun (air pressure 38-40 psi) to a wet film thickness of 4 mils. The sprayed panels were flashed at room temperature for 4 minutes and then cured under a forced air oven. The coatings were cured with a Fusion microwave powered unit using the Gallium doped lamp, followed by the mercury lamp at 20 feet/min. The energy density output was 1800 mJ/cm2. The resulting coating had a dry film thickness of 1.8 to 2.0 mils. Then the pigmented 2K polyaspartic ester coating described in Example 6 was applied immediately on top of the NCO-rich UV coating and cured as described earlier. The formulations had excellent adhesion to cold rolled steel and galvanized steel and excellent intercoat adhesion as measured by crosshatch test (ASTM D3359-95).

Example 11

To 100 parts of the formulation described in Example 4, 5.3 parts of Desmophen® 2089 was added to the formulation and applied to cold rolled steel and galvanized steel substrates by spraying with a Binks skilled in the art without departing from the spirit and scope of the invention except as it may be limited by the claims.

What is claimed is:
1. A method of coating a metal substrate comprising 1) applying a non-aqueous composition directly to the metal substrate, wherein the non-aqueous composition comprises
A) from about 10% to about 90% by weight of an unsaturated urethane (meth)acrylate polymer or oligomer prepared by reacting reactants consisting of:
ai) one or more organic polyisocyanates, and
aii) one or more OH functional compounds selected from the group consisting of ethylene glycol; diethylene glycol; triethylene glycol; propylene glycol; dipropylene glycol; butane diols; hexane diols; glycerin; trimethylolethane; trimethylolpropane; pentaerythritol; hexane triols; mannitol; sorbitol; glucose; fructose; mannose; and sucrose; and
aiii) 1) a mono-, di-, tri- or poly-hydroxyl-$C_1$-$C_{10}$-alkyl or $C_6$-$C_{10}$-aryl (meth)acrylate, or
2) an unsaturated polyether or polyester (meth)acrylate polyol having an OH number of from about 30 to about 500 and prepared by reacting a polyether or polyester di- or polyol with acrylic and/or methacrylic acid, or
3) a combination of aiii)1) and aiii)2),
at an isocyanate to hydroxyl equivalent ratio of from about 0.9:1 to about 1:0.9,
B) from about 0 to about 80% by weight of an unsaturated epoxy (meth)acrylate which is substantially free from epoxide groups and is prepared by reacting
bi) one or more organic compounds containing at least one epoxide group and having a number average molecular weight of from about 130 to about 1000,
bii) from 1.3 to 3.0 carboxy equivalents of organic dicarboxylic acid or anhydride having a number average molecular weight of from about 98 to about 166,
biii) 1 hydroxy equivalent of an hydroxyl group containing reaction product, prepared at a carboxy to hydroxyl equivalent ratio of from 0.6:1 to 0.95:1 of

1) (meth)acrylic acid and
2) tri- or tetrahydroxy ether alcohols having a number average molecular weight of from about 180 to about 1000 and containing at least two ethylene and/or propylene oxide units as part of an ether structure,
with the ratio of reactive equivalents of components bii) through biii) to epoxide equivalents of component bi) being at least about 1:1,
C) from 0 to about 100% by weight of reactive diluents selected from a mono-, di-, tri- or poly —$C_1$-$C_{10}$-alkyl or $C_6$-$C_{10}$-aryl {(meth) acrylates} or vinyl ethers or their mixtures, wherein the % by weight of component C) is based on the total combined amount of components A) and B),
D) from about 0.1 to about 10% by weight of one or more photoinitiators, wherein the % by weight of component D) is based on the combined weight of components A), B) and C) and wherein the percentages of components A), B) and C) total 100%, and
E) from 0 to about 90% by weight of solvent or a mixture of solvents, wherein the % by weight of component E) is based on the total combined amount of components A), B) and C),
wherein the combination of components C) and E) is used in an amount totaling 10 to 90% by weight;
2) curing the non-aqueous composition by exposing the non-aqueous composition to UV radiation; and
3) applying a two-component, polyurethane-forming composition comprising a polyisocyanate component and an isocyanate-reactive component to the substrate during or subsequent to step 1),
wherein either
a) an —OH or —NH functional compound is applied to the substrate during the step of applying the non-aqueous composition to the substrate; or
b) an NCO-functional compound is applied to the substrate during the step of applying the non-aqueous composition to the substrate,
with the proviso that no solvent wipe of the non-aqueous composition is performed between steps 1) and 3).

2. The method of claim 1 wherein the composition comprises from about 25 to about 75% by weight of component A), from about 10 to about 50% by weight of component B), and from about 25 to about 75% by weight of component C) and/or E).

3. The method of claim 1, wherein component aiii)2) has an OH number of from about 100 to about 400.

4. The method of claim 3, wherein component aiii)2) has an OH number of from about 100 to about 300.

5. The method of claim 1 wherein the isocyanate to hydroxyl equivalent of component A) is about 1:1.

6. The method of claim 1, wherein from about 1.8 to about 2.2 carboxy equivalents of organic dicarboxylic acid or anhydride (component bii)) are reacted.

7. The method of claim 6, wherein from about 1.9 to about 2.1 carboxy equivalents of organic dicarboxylic acid or anhydride (component biii)) are reacted.

8. The method of claim 1, wherein component bi) contains an average of from 1.5 to 6 epoxide groups per molecule.

9. The method of claim 8, wherein component bi) contains an average of from 1.5 to 2 epoxide groups per molecule.

10. The method of claim 1, wherein the carboxy to hydroxyl equivalent ratio (component biii)) is from 0.65:1 to 0.9:1.

11. The method of claim 1, wherein the metal substrate is new or weathered galvanized steel.

12. The method of claim 1, wherein the metal substrate is treated or untreated steel.

13. The method of claim 1, wherein the metal substrate is aluminum.

14. The method of claim 1, wherein the metal substrate is a metal alloy.

15. The method of claim 1, wherein the radiation has a wavelength of 200 nm and above.

16. The method of claim 1, wherein the radiation has a wavelength of 200 nm to 450 nm.

17. The method of claim 1, wherein the radiation has a wavelength of 320 nm to 420 nm.

18. The method of claim 1, wherein the source of the radiation is sunlight.

19. The method of claim 1, wherein the two-component, polyurethane-forming composition is applied after the non-aqueous composition is exposed to UV radiation.

20. The method of claim 1, wherein the two-component, polyurethane-forming composition is applied before or while the non-aqueous composition is exposed to UV radiation.

21. The method of claim 1, wherein in step 3) an —OH or —NH-functional compound is applied to the substrate during the step of applying the non-aqueous composition to the substrate.

22. The method of claim 21, wherein the two-component, polyurethane-forming composition has a ratio of isocyanate groups to isocyanate-reactive groups of one or greater than one.

23. The method of claim 1, wherein in step 3) an NCO-functional compound is applied to the substrate during the step of applying the non-aqueous composition to the substrate.

24. The method of claim 23, wherein the two-component, polyurethane-forming composition has a ratio of isocyanate groups to isocyanatere-active groups of 20:1 to 1:20.

25. The method of claim 1, wherein the non-aqueous composition applied directly to the metal substrate is a liquid.

26. The method of claim 1, wherein the composition comprises C) and component C) comprises a (meth)acrylate monomer.

27. The method of claim 26, wherein the composition comprises C) from about 10% to about 90% by weight of a reactive diluent comprising the (meth)acrylate monomer.

28. The method of claim 25, wherein the (meth)acrylate monomer comprises a $C_1$-$C_{10}$-alkyl or $C_6$-$C_{10}$-aryl(meth)acrylate.

29. The method of claim 25, wherein the composition comprises C) and component C) comprises a (meth)acrylate monomer.

30. The method of claim 29, wherein the composition comprises C) from about 10% to about 90% by weight of a reactive diluent comprising the (meth)acrylate monomer.

31. The method of claim 30, wherein the (meth)acrylate monomer comprises a $C_1$-$C_{10}$-alkyl or $C_6$-$C_{10}$-aryl(meth)acrylate.

32. A method of coating a metal substrate comprising 1) applying a non-aqueous composition directly to the metal substrate, wherein the non-aqueous composition comprises
A) from about 10% to about 90% by weight of an unsaturated urethane (meth)acrylate polymer or oligomer prepared by reacting reactants consisting of:
ai) one or more organic polyisocyanates, and
aii) one or more —NH functional compounds, and
aiii) 1) a mono-, di-, tri- or poly-hydroxyl-$C_1$-$C_{10}$-alkyl or $C_6$-$C_{10}$-aryl (meth)acrylate, or 2) an unsaturated polyether or polyester (meth)acrylate polyol having an OH number of from about 30 to about 500 and prepared by reacting a polyether or polyester di- or polyol with acrylic and/or methacrylic acid, or
3) a combination of aiii)1) and aiii)2),
at an isocyanate to hydroxyl equivalent ratio of from about 0.9:1 to about 1:0.9, B) from about 0 to about 80% by weight of an unsaturated epoxy (meth)acrylate which is substantially free from epoxide groups and is prepared by reacting
bi) one or more organic compounds containing at least one epoxide group and having a number average molecular weight of from about 130 to about 1000,
bii) from 1.3 to 3.0 carboxy equivalents of organic dicarboxylic acid or anhydride having a number average molecular weight of from about 98 to about 166,
biii) 1 hydroxy equivalent of an hydroxyl group containing reaction product, prepared at a carboxy to hydroxyl equivalent ratio of from 0.6:1 to 0.95:1 of
1) (meth)acrylic acid and
2) tri- or tetrahydroxy ether alcohols having a number average molecular weight of from about 180 to about 1000 and containing at least two ethylene and/or propylene oxide units as part of an ether structure,
with the ratio of reactive equivalents of components bii) through biii) to epoxide equivalents of component bi) being at least about 1:1, C) from 0 to about 100% by weight of reactive diluents selected from a mono-, di-, tri- or poly —$C_1$-$C_{10}$-alkyl or $C_6$-$C_{10}$-aryl {(meth) acrylates} or vinyl ethers or their mixtures, wherein the % by weight of component C) is based on the total combined amount of components A) and B), D) from about 0.1 to about 10% by weight of one or more photoinitiators, wherein the % by weight of component D) is based on the combined weight of components A), B) and C) and wherein the percentages of components A), B) and C) total 100%, and E) from 0 to about 90% by weight of solvent or a mixture of solvents, wherein the % by weight of component E) is based on the total combined amount of components A), B) and C), wherein the combination of components C) and E) is used in an amount totaling 10 to 90% by weight;

2) curing the non-aqueous composition by exposing the non-aqueous composition to UV radiation; and 3) applying a two-component, polyurethane-forming composition comprising a polyisocyanate component and an isocyanate-reactive component to the substrate during or subsequent to step 1),
wherein either
a) an —OH or —NH functional compound is applied to the substrate during the step of applying the non-aqueous composition to the substrate; or
b) an NCO-functional compound is applied to the substrate during the step of applying the non-aqueous composition to the substrate,
with the proviso that no solvent wipe of the non-aqueous composition is performed between steps 1) and 3).

* * * * *